US010453320B2

(12) United States Patent
Farley et al.

(10) Patent No.: US 10,453,320 B2
(45) Date of Patent: Oct. 22, 2019

(54) ADDRESSING METHOD FOR SLAVE UNITS IN FIRE DETECTION SYSTEM

(71) Applicant: Tyco Fire & Security GmbH, Neuhausen am Rheinfall (CH)

(72) Inventors: Robert W. Farley, Ashburnham, MA (US); James Ogier, Shirley, MA (US)

(73) Assignee: Johnson Controls Fire Protection LP, Boca Raton, FL (US)

( * ) Notice: Subject to any disclaimer, the term of this patent is extended or adjusted under 35 U.S.C. 154(b) by 244 days.

(21) Appl. No.: 15/095,697

(22) Filed: Apr. 11, 2016

(65) Prior Publication Data

US 2017/0294092 A1    Oct. 12, 2017

(51) Int. Cl.
| *G06F 15/16* | (2006.01) |
| *G08B 17/00* | (2006.01) |
| *H04L 29/12* | (2006.01) |
| *H04L 29/08* | (2006.01) |

(52) U.S. Cl.
CPC .......... *G08B 17/00* (2013.01); *H04L 61/2038* (2013.01); *H04L 67/12* (2013.01)

(58) Field of Classification Search
CPC ...... G08B 17/00; H04L 61/2038; H04L 67/12
USPC ....................................................... 709/245
See application file for complete search history.

(56) References Cited

U.S. PATENT DOCUMENTS

| 5,521,588 | A |   | 5/1996  | Kuehner et al. |
| 6,034,960 | A | * | 3/2000  | Beshai ................ H04L 12/5602 |
|           |   |   |         | 370/395.4 |
| 6,751,682 | B1| * | 6/2004  | Stirling ............... G06F 12/0669 |
|           |   |   |         | 709/220 |
| 8,232,869 | B2|   | 7/2012  | Bennett |
| 2002/0129216 | A1 |   | 9/2002  | Collins |
| 2005/0251673 | A1 |   | 11/2005 | Bosley et al. |
| 2006/0224048 | A1 | * | 10/2006 | Devaul ................ A61B 5/0024 |
|           |   |   |         | 600/300 |
| 2007/0021844 | A1 |   | 1/2007  | Kuhls et al. |
| 2008/0189349 | A1 | * | 8/2008  | Krig ........................ H04L 63/12 |
|           |   |   |         | 709/200 |
| 2008/0263181 | A1 |   | 10/2008 | Nagata |
| 2009/0249325 | A1 |   | 10/2009 | Wontorcik et al. |

(Continued)

FOREIGN PATENT DOCUMENTS

| DE | 102 40 832 A1   | 3/2004 |
| WO | 2014/209368 A1  | 12/2014 |

OTHER PUBLICATIONS

Ansul Checkfire 210 Detection and Actuation Product Overview, www.ansul.com, 2014. Two pages.

(Continued)

*Primary Examiner* — Jeffrey R Swearingen
*Assistant Examiner* — Oluwatosin M Gidado
(74) *Attorney, Agent, or Firm* — HoustonHogle LLP

(57) ABSTRACT

A method and system for assigning working addresses to slave units in a vehicle fire system. Slave units responding to a default address are identified along with available working addresses. Individual slave units are isolated at the default address by instructing the slaves to compare their serial numbers to a broadcast serial number until only a single slave responds, wherein bits in the serial numbers are reversed to create a more sparse distribution of the serial numbers of the slave units, and assigning the slave units, which responded to the default address, to the available working addresses.

20 Claims, 12 Drawing Sheets

(56) References Cited

U.S. PATENT DOCUMENTS

| | | | |
|---|---|---|---|
| 2010/0176931 A1 | 7/2010 | Bennett | |
| 2011/0035741 A1 | 2/2011 | Thiyagarajan | |
| 2012/0271924 A1* | 10/2012 | Spitaels | H04L 29/1232 709/220 |
| 2013/0322762 A1* | 12/2013 | Zeng | G06K 9/4638 382/195 |
| 2014/0068561 A1 | 3/2014 | Halder | |
| 2015/0222541 A1* | 8/2015 | West | H04L 41/0806 370/216 |
| 2015/0310191 A1* | 10/2015 | Koval | H04L 67/12 713/189 |
| 2016/0142370 A1* | 5/2016 | Linder | H04L 61/2053 709/226 |
| 2017/0293478 A1 | 10/2017 | Farley et al. | |
| 2017/0293630 A1 | 10/2017 | Farley et al. | |

OTHER PUBLICATIONS

Ansul Fire Protection for Mobile Forestry Equipment, www.ansul.com, 2014. Two pages.

International Search Report and Written Opinion of the International Searching Authority, dated Jun. 21, 2017, from International Application No. PCT/IB2017/052095, filed on Apr. 11, 2017. Fourteen pages.

International Search Report and the Written Opinion of the International Searching Authority, dated Jul. 10, 2017, from International Application No. PCT/IB2017/052098, filed on Apr. 11, 2017. Thirteen pages.

International Search Report and the Written Opinion of the International Searching Authority, dated Jul. 10, 2017, from International Application No. PCT/IB2017/052096, filed on Apr. 11, 2017. Fifteen pages.

Anonymous, "Clustered file system—Wikipedia," en.wikipedia.org, Mar. 31, 2016, pp. 1-7, XP055386966. Seven pages.

International Preliminary Report of Patentability of the International Searching Authority, dated Oct. 25, 2018, from International Application No. PCT/IB2017/052095, filed on Apr. 11, 2017. 9 pages.

International Preliminary Report of Patentability of the International Searching Authority, dated Oct. 25, 2018, from International Application No. PCT/IB2017/052096, filed on Apr. 11, 2017. 8 pages.

International Preliminary Report of Patentability of the International Searching Authority, dated Oct. 25, 2018, from International Application No. PCT/IB2017/052098, filed on Apr. 11, 2017. 8 pages.

* cited by examiner

| Address | Serial Number | Module |
|---|---|---|
| 0 | 0099 | master |
| 1 | 0100 | fire sensor |
| 2 | (none) | (none) |
| 3 | 0101 | release |
| 4 | (none) | (none) |
| 5 | (none) | (none) |
| 6 | (none) | (none) |
| ⋮ | | |
| 118 | (none) | (none) |
| 119 | (none) | (none) |
| 120 (default address) | 0102<br>0103<br>0104<br>0105 | fire sensor<br>IR detector<br>manual activation switch<br>battery |

FMTVSA (Vacant Slave Address Inquiry)

FMTATS (Address Transmission Success)

| | |
|---|---|
| Format Code 0x6A | |
| Card Address | |
| Module ID | |

510

224

| Address | Serial Number | Module |
|---|---|---|
| 0 | 0099 | master |
| 1 | 0100 | fire sensor |
| 2 | 0103 | IR detector |
| 3 | 0101 | release |
| 4 | (none) | (none) |
| 5 | (none) | (none) |
| 6 | (none) | (none) |
| ⋮ | | |
| 118 | (none) | (none) |
| 119 | (none) | (none) |
| 120 (default address) | 0102<br>0104<br>0105 | fire sensor<br>manual activation switch<br>battery unit |

224

| Address | Serial Number | Module |
|---|---|---|
| 0 | 0099 | master |
| 1 | 0100 | fire sensor |
| 2 | 0103 | IR detector |
| 3 | 0101 | release |
| 4 | 0105 | battery |
| 5 | (none) | (none) |
| 6 | (none) | (none) |
| ... | | |
| 118 | (none) | (none) |
| 119 | (none) | (none) |
| 120 (default address) | 0102 0104 | fire sensor manual activation switch |

| Address | Serial Number | Module |
|---|---|---|
| 0 | 0099 | master |
| 1 | 0100 | fire sensor |
| 2 | 0103 | IR detector |
| 3 | 0101 | release |
| 4 | 0105 | battery |
| 5 | 0102 | fire sensor |
| 6 | (none) | (none) |
| ... | | |
| 118 | (none) | (none) |
| 119 | (none) | (none) |
| 120 (default address) | 0104 | manual activation switch |

FIG. 15

ADDRESSING METHOD FOR SLAVE UNITS IN FIRE DETECTION SYSTEM

RELATED APPLICATIONS

This application is related to U.S. application Ser. No. 15/095,680, filed on Apr. 11, 2016, entitled "Fire detection system with automatic firmware updating", now U.S. Patent Publication No.: 2017/0293478, and U.S. application Ser. No. 15/095,691, filed on Apr. 11, 2016, entitled "Fire detection system with distributed file system", now U.S. Patent Publication No.: 2017/0293630, both of which are incorporated herein by reference in their entirety.

BACKGROUND OF THE INVENTION

Fire systems, such as fire detection systems, fire suppression systems or combination fire detection and suppression systems, typically comprise a master module and a series of slave units. Slave units have elements that are designed to perform specific tasks related to fire detection, notification, and suppression, such as detecting information about the environment and communicating the information to the master module, or, upon receiving instructions from the master module, performing a fire suppression function or generating an audible and/or visual alert to occupants.

Different types of slave units or combinations of slave units are typically deployed based on the specific application. Fire systems for premises typically include fire sensors, pull stations, and alarms. On the other hand, fire systems for vehicles typically include a variety of sensors, release modules, annunciators, and manual override switches.

Fire systems are installed on large vehicles such as those used in the mining, forestry, landfill and mass transit industries to prevent or mitigate damage to complex and expensive equipment. For example, a mining dump truck could feature a reciprocating engine driving a generator, which in turn provides power to electric motors that drive the wheels. Any one of these components can overheat and catch on fire, causing extensive damage to complex and expensive equipment. The fire systems are employed to minimize such losses.

The master modules and slave units of fire systems are typically installed on a common bus. As a result, they need to have unique working addresses so that the master module can communicate with individual slave units. Slave units typically also have a serial number or unique identification number programmed into their read-only (ROM) memory. Serial numbers are generally large (typically 8 or more bytes). By contrast, working addresses need to be small (typically a single byte) in order to facilitate efficient communication between the master module and slave units.

In some systems, the slave units are assigned working addresses at installation. These addresses are commonly indicated by setting dual in-line package (DIP) or rotary switches. Assigning or changing the address of a slave module requires physical access to the above mentioned switches.

Other systems employ the serial numbers to dynamically assign working addresses. The system described in "Identifying a Plurality of Devices," U.S. Pat. No. 8,232,869 B2 to Bennett, which is incorporated herein by this reference, scans for matching serial numbers at varying levels. The master module determines that there are slave units that have not been assigned a working address. The master module broadcasts only a portion of the serial number (i.e. the portion of the serial number containing a certain number of the least significant bits) with instructions for the slave units that have not been assigned working addresses to compare the portion of the serial number to the corresponding portion of their own serial numbers and respond if they match. If a match is found, the slave unit with the matching serial number is assigned a working address.

In this system, the possibility exists for data collisions to occur. When the portion of the serial number for more than one slave unit matches the serial number portion broadcast by the master module, each matching slave unit sends a response message simultaneously. Because the master and slaves are installed on a common bus, the transmissions collide, resulting in corrupted data. Collisions are detected by the master module through the use of checksum or CRC values contained in the transmissions. In the event of a collision, the master module initiates a second level scan that broadcasts a larger portion of the serial number (i.e. a greater number of bits) than the first level scan in order to differentiate between the two or more slave units that responded.

SUMMARY OF THE INVENTION

The problem with assigning addresses through the setting of DIP or rotary switches is that modules in fire systems, especially vehicle fire systems, often need to be potted, or submerged in a gel or solid to protect them from the harsh environments typical of fire systems. As a result, DIP or rotary switches cannot be used.

One problem with the dynamic addressing method is the imprecise detection of collisions. Statistically, using checksum values to validate data transmissions can result in undetected collisions, which could result in problems such as two slaves being assigned a single working address, or a working address being assigned (via a corrupted serial number) to a slave unit that does not exist. Consequences could range from inefficient communication to system malfunction or having to re-initialize the system.

Another problem with these existing dynamic addressing methods is the presumption that serial numbers are evenly distributed across the possible serial number space. In fact, this is often not the case, as different units of fire systems are often manufactured in the same facility, within a very narrow timeframe. Units belonging to a single fire system can be manufactured on the same day in the same manufacturing facility, resulting in serial numbers that differ by only a few bits, because the date and place of manufacture form part of these numbers. This clumping in serial number space of similar serial numbers by units in the same system cancels out the beneficial effect of scanning for only the least significant bits of the serial number, as most serial numbers in fact differ only in the portion of the serial number scanned for in the first level scan. As a result, the method requires a large number of iterations of the scanning process in order to identify all of the slave units that are not assigned working addresses. A larger number of search iterations results in inefficiency.

In implementations, the present invention features a process of creating a more sparse distribution of serial numbers across the serial number space and a more robust system for detecting collisions. Slave units that are not assigned working addresses are isolated using bit reversal in the broadcast serial numbers in order to create a more sparse distribution of serial numbers across the serial number space.

In general, according to one aspect, the invention features a method for assigning working addresses to slave units in a vehicle fire system. The method comprise identifying slave units responding to a default address, determining available working addresses, isolating individual slave units at the default address by instructing the slaves to compare their serial numbers to a broadcast serial number until only a single slave responds, wherein bits in the serial numbers are reversed to create a more sparse distribution of the serial numbers of the slave units, and assigning the slave units, which responded to the default address, to the available working addresses.

In a current embodiment, identifying slave units responding to the default address comprises sending a message to the default address and determining if any slave units reply. Further, determining available working addresses comprises incrementing through working addresses until no slave units respond to a current address, which is then determined to be an available address. Slaves respond with their newly assigned working address and at least part of their serial number.

In general, according to another aspect, the invention features a method for assigning working addresses to slave units in a vehicle fire system. The method comprises determining available working addresses, isolating individual slave units at a default address by instructing the slaves to compare their serial numbers to a broadcast serial number until only a single slave responds, confirming that individual slave units have been isolated by responding with a potentially corrupt serial number and confirming whether a slave unit responded, and assigning the slave units, which responded to the default address, to the available working addresses.

In general, according to another aspect, the invention features a vehicle fire system, comprising slave units and a master module for assigning working addresses to the slave units by identifying slave units responding to a default address. This master determines available working addresses, and assigns the slave units, which responded to the default address, to the available working addresses. This assignment is performed by isolating individual slave units at the default address by instructing the slaves to compare their serial numbers to broadcast serial numbers broadcast by the master module until only a single slave unit responds and choosing the broadcast serial numbers by reversing bits in the broadcast serial numbers to create a more sparse distribution of the serial numbers of the slave units at the default address.

In general, according to another aspect, the invention features vehicle fire system, comprising slave units and a master module for assigning working addresses to the slave units by identifying slave units responding to a default address, determining available working addresses, and assigning the slave units, which responded to the default address, to the available working addresses, by isolating individual slave units at the default address by instructing the slaves to compare their serial numbers to broadcast serial numbers broadcast by the master module until only a single slave unit responds, and confirming that individual slave units have been isolated by responding with a potentially corrupt serial number and confirming whether a slave unit responded.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 14 shows the address space after the second slave unit responding to the default address is assigned an address;

FIG. 15 shows the address space after the third slave unit responding to the default address is assigned an address.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
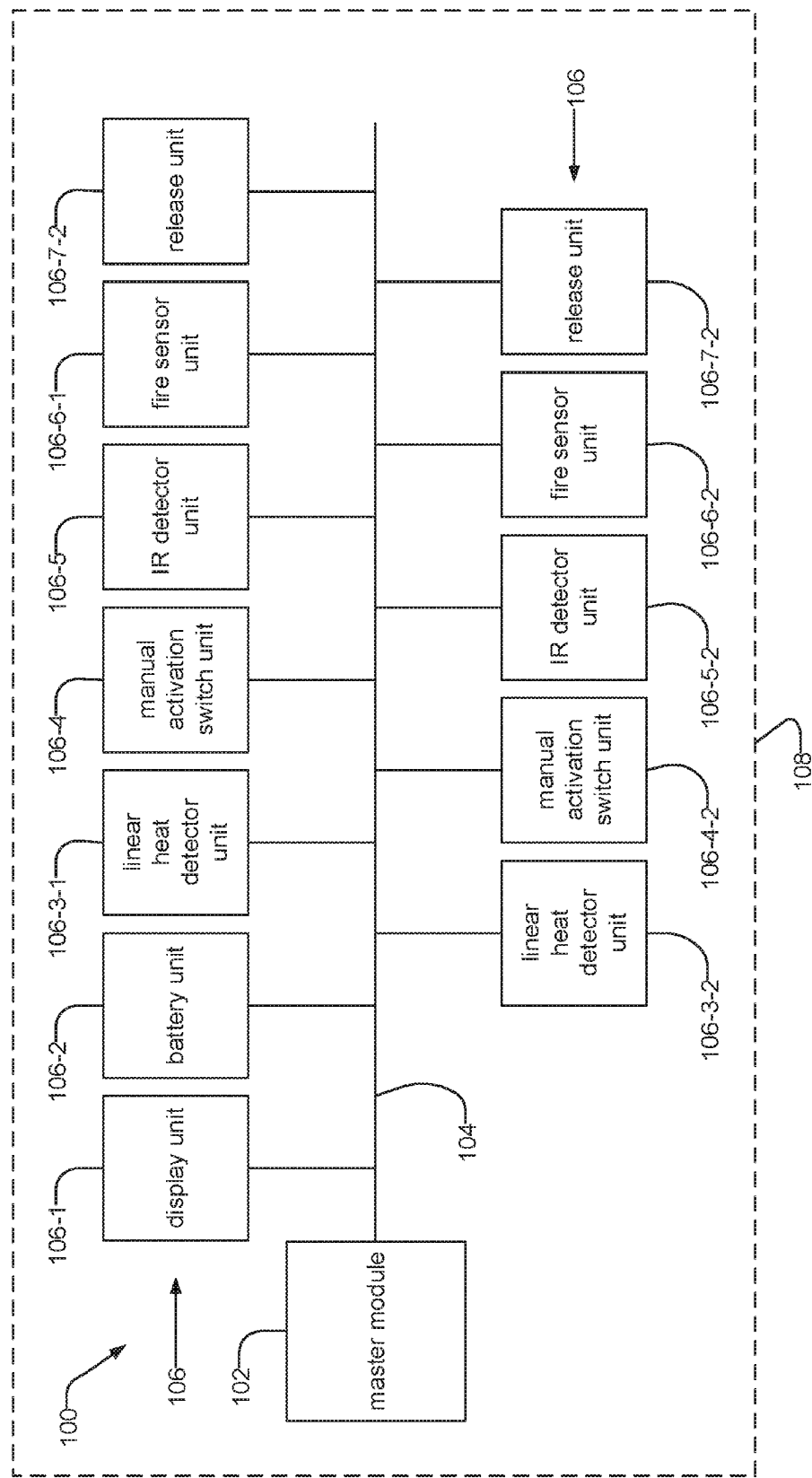
FIG. 1 is a block diagram of a fire system installed on a vehicle, for example.

FIG. 1 is a block diagram of a fire system 100, such as a fire detection system, a fire suppression system or a combination fire detection and suppression system, installed on a vehicle 108, to which the present invention is applicable.

The system 100 comprises a master module 102 and a series of slave units 106 installed on a common bus 104. The master module 102 sends instructions to and receives information from the slave units 106, and the slave units 106 receive instructions from the master module 102 and send information (for example, information about the environment detected by a slave unit 106) to the master module 102.

The data bus 104 is preferably common from a logical perspective. The master module 102 preferably uses a common address space to communicate with the various slave units 106 using the data bus 104. That said, the bus 104 is currently implemented as several physical data buses/wiring interfaces (ports) on the master module 102. This helps to ensure proper and repeatable installation by having specific units be connected to specific wiring interfaces or ports on the master module 102.

In the illustrated example, the installed slave units include a display unit 106-1, which displays information about the state of the fire system 100, a battery unit 106-2, which supplies power to the fire system 100, two linear heat detector units 106-3, which detect heat and communicate information to the master module 102, two manual activation switch units 106-4, which, when activated by an operator (for example, a driver of the vehicle) trigger a fire suppression function, two IR detector units 106-5, which detect infrared radiation and communicate information to the master module 102, two fire sensor units 106-6, which detect the presence of fire and communicate information to the master module 102, and two release units 106-7, which perform a fire suppression function.

In one example, the fire sensor unit 106-6 could detect that a fire is present through the operation of its fire sensor slave element and send the information to the master module 102. The master module 102, in turn, could then send instructions to the release module 106-7 to perform a fire suppression function, and/or instructions to the display 106-1 to display an alert.

Figure 2A:
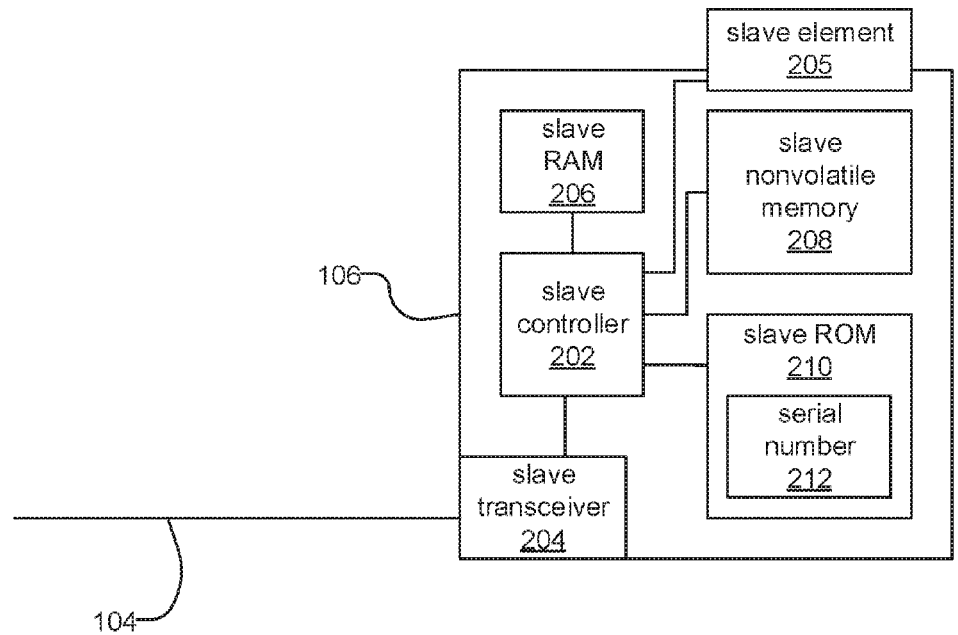
FIG. 2A is a schematic diagram of a generic slave unit.
Figure 2B:
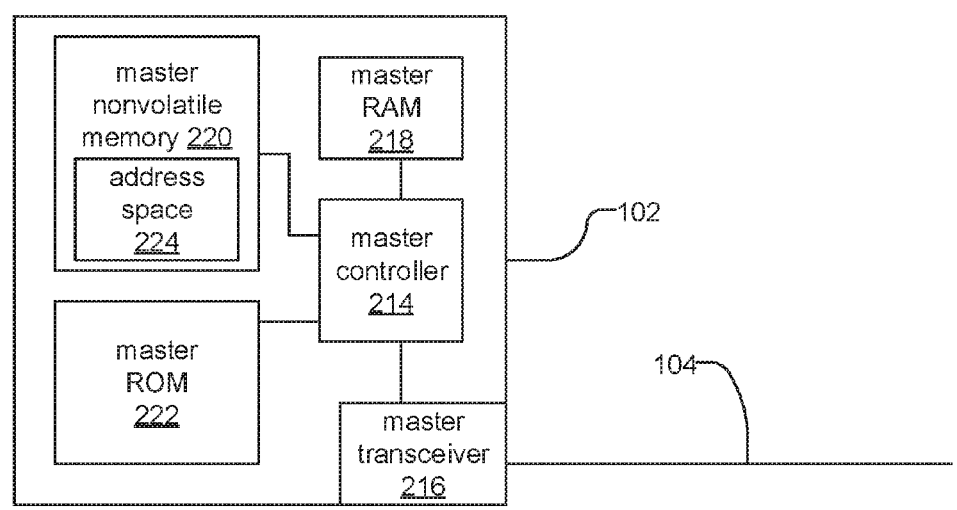
FIG. 2B is a schematic diagram of a master module.

FIGS. 2A-2B are schematic diagrams of a master module and a generic slave unit of the fire system 100. Each unit similarly includes a controller 202, 214, a transceiver 204, 216, volatile random access memory (RAM) 206, 218, nonvolatile memory 208, 220, and read only memory (ROM) 210, 222. Each unit 106, 102 connects to the common bus 104 through its transceiver 204, 216.

FIG. 2A is a schematic diagram of a generic slave unit 106. Examples include fire sensor units 106-6, release units 106-7, IR detector units 106-5, manual activation switch units 106-4, and battery units 106-2. The slave ROM 210 stores the slave unit's serial number 212, which is a unique identification number assigned to the slave unit when it is manufactured. Each of the slave units typically includes a slave element 205, which is typically different for each type of slave. For example, for a smoke detector slave unit, the slave element 205 is a smoke sensor that detects smoke, with the slave controller monitoring the detected smoke levels by the element and communicating those levels to the master module. In another example, for a fire detector slave unit, the slave element 205 might be a thermistor that detects ambient temperature with the slave controller monitoring the detected temperatures levels and communicating those levels to the master module or triggering an alarm condition itself. In the case of a release unit, the slave element 205 might be a relay that controls the release of fire suppressant. The slave controller in this case waits for a release instruction from the master module 102 and then operates the relay accordingly.

FIG. 2B is a schematic diagram of the master module 102. The master nonvolatile memory 220 stores an address space 224, which is information about each slave unit 106, including the slave unit's assigned address, serial number, and the type of module.

Figure 3:
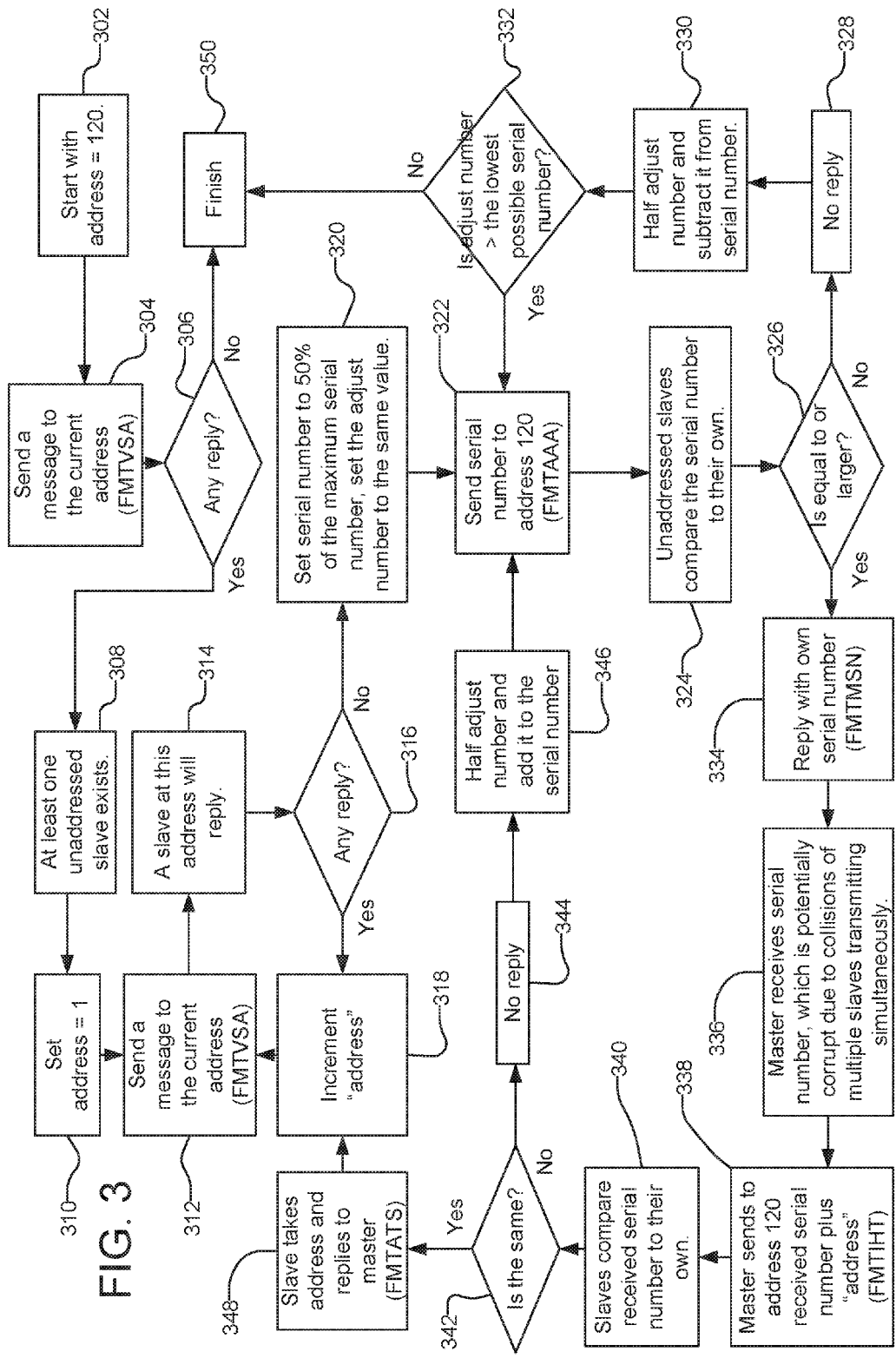
FIG. 3 is a flow diagram showing the method assigning addresses to slave units by the master module.

FIG. 3 is a flow diagram showing the method for assigning working addresses to slave units 106 by the master module 102.

Steps 302 through 308 illustrate the process of determining whether there are any unaddressed slave units 106 installed on the fire system 100. Unaddressed slave units 106 are listed in the address space 224 under the default address "120".

In one example intended to illustrate the operation, a fire system 100 includes a master module 102, two fire sensors 106-6, a release unit 106-7, an IR detector unit 106-5, a manual activation switch unit 106-4, and a battery unit 106-2, of which the second fire sensor unit 106-6-2, the IR detector unit 106-5, the manual activation switch unit 106-4, and the battery unit 106-2 are unaddressed slave units 106.

Figures 4, 5:
FIG. 4 is a diagram of the address space.
FIG. 5 illustrates the vacant slave address inquiry.

Illustrating this example, FIG. 4 is a diagram of an address space 224, which lists addresses from 0 through 120 inclusive, where address "0" is always assigned to the master module 102, and address "120" is always the default address. In this example, address "1" is assigned to the first fire sensor unit 106-6-1, which has a serial number of "0100". Address "2" is not assigned to any slave units 106. Address "3" is assigned to the release unit 106-7, which has a serial number of "0101". Addresses "4" through "119" are not assigned to any slave units 106. Finally, address "120" lists the second fire sensor unit 106-6-2, which has a serial number of "0102", the IR detector unit 106-5, which has a serial number of "0103", the manual activation switch unit 106-4, which has a serial number of "0104", and the battery unit 106-2, which has a serial number of "0105", indicating that these four unaddressed slave units 106 respond to the default address "120".

As the unaddressed slave units 106 respond to the default address, the master module 102 determines whether there are any unaddressed slave units 106 by sending instructions to the default address and determining whether a response is received.

FIG. 5 illustrates the vacant slave address inquiry 502, which is an instruction sent by the master module 102 to a slave unit 106 at an address in the address space 224. The vacant slave address inquiry 502 includes a header with a format code, which is a unique code specifying the instruction given. Slave units 106 that receive the vacant slave address inquiry 502 must send a response to the master module 102 with an acknowledgment.

Returning to FIG. 3, in step 302, the master module 102 starts with address 120, which is the default address. In step 304, the master module 102 then sends a vacant slave address inquiry 502 to the default, and in step 306 it is determined whether a response is received. If there is no response, the addressing process ends in step 350. If there is a response, it is determined that at least one unaddressed slave unit 106 exists on the fire system 100.

Steps 310 through 318 illustrate the process of determining the next available address in the address space 224. In step 310, the master module 102 sets a current address to 1, the current address being the address to which the master module 102 sends instructions to determine the next available address. In step 312, the master module 102 sends a vacant slave address inquiry 502 to the current address. In step 314, a slave unit 106 assigned to the current address potentially sends a response to the master module 102. In step 316, it is determined whether a response is received by the master module 102 from a slave unit 106 at the current address. If a response is received, it can be concluded that a slave unit 106 is already assigned to the address. In this case, in step 318, the current address is incremented, and another vacant slave address inquiry 502 is sent to the current address. Steps 312 through 318 repeat until no response is received in step 316, at which point the current address is determined to be the next available address in the address space 224.

In general, steps 320 through 346 illustrate the process of targeting a single unaddressed slave unit 106 in order to assign it an address. Throughout the process, the master module 102 sends messages to the default address. Because the possibility exists for multiple slave units 106 to respond to the default address, a binary search of the serial numbers 212 of the slave units 106 is used to isolate the slave units 106.

Figure 6:
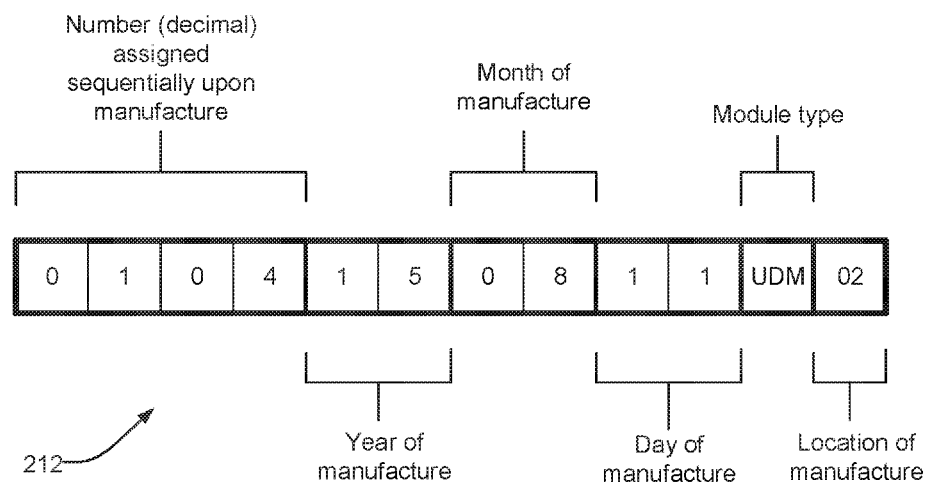
FIG. 6 is a diagram of the serial number of a module installed on a fire system.

FIG. 6 is a diagram of the serial number 212 of a module installed on a fire system 100. The serial number 212 includes a four digit decimal number assigned sequentially to the module upon its manufacture, the year, month and day of manufacture, a code indicating the module type, and a code indicating the location of manufacture. In the illustrated example, only the sequential four digit decimal number is depicted for the purpose of clarity. However, it should be noted that the method described can include the full serial number 212 or any portion thereof.

As it is not uncommon for slave units 106 manufactured in close succession to be installed on the same fire system 100, it is possible for serial numbers 212 on one system 100 to differ by only a few bits. For instance, in the illustrated example, the serial numbers 212 listed in the address space 224 are "0099", "0100", "0101", "0102", "0103", "0104", and "0105". In order to make the binary search more efficient, the bits in the serial numbers are reversed, creating a more sparse distribution of serial numbers across the serial number space.

Figure 7:
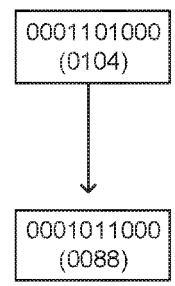
FIG. 7 illustrates one example of bit reversal in a serial number.

FIG. 7 illustrates one example of bit reversal in a serial number 212. In the illustrated embodiment, the bits of the serial number are reversed such that the first bit is swapped with the last bit, the second bit is swapped with the second to last bit, and so on for all bits of the serial number. After the bit reversal process, the serial number "0104" has been changed to serial number "0088".

Figure 8:
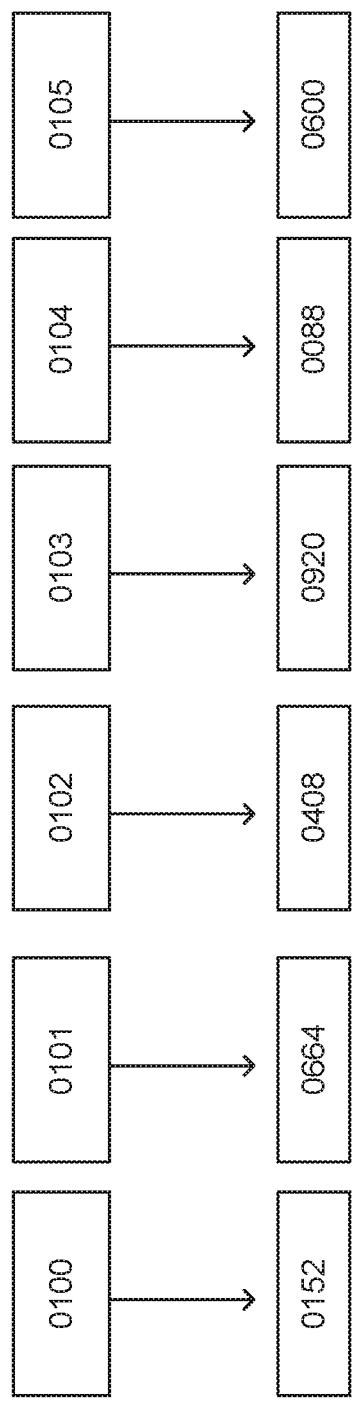
FIG. 8 illustrates an example of bit reversal for a series of sequential serial numbers.

FIG. 8 illustrates an example of bit reversal for a series of sequential serial numbers 212. In the illustrated example, the number "0100" becomes "0152", "0101" becomes "0664", "0102" becomes "0408", "0103" becomes "0920", "0104" becomes "0088", and "0105" becomes "0600". As a result of bit reversal, the group of sequential numbers has become more sparsely distributed.

Returning to FIG. 3, the search for an isolated slave unit 106 responding to the default address begins in step 320, in which a broadcast serial number, which is a potential serial number sent from the master module 102 to the slave units 106 responding to the default address, is set to 50% of the highest possible serial number. An adjust number, which is a value by which the broadcast serial number is either increased or decreased throughout the search, is set to the same value as the broadcast serial number.

Figure 9:
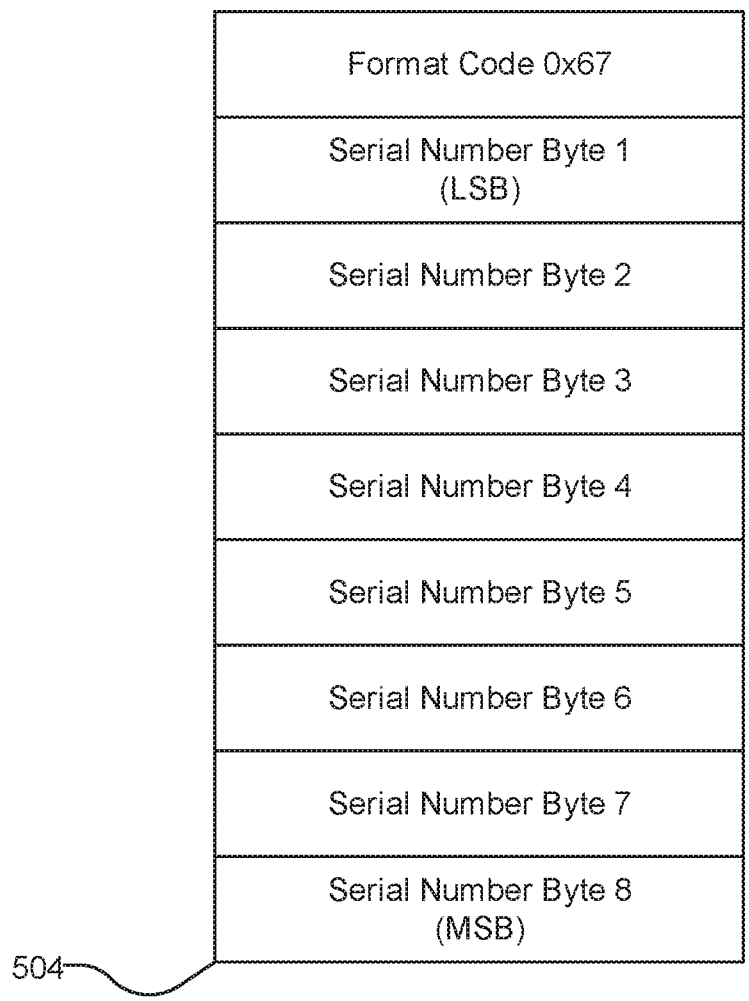
FIG. 9 illustrates the automated address acquisition instruction.

The master module 102 communicates the broadcast serial number to the slave units 106 using a particular instruction. FIG. 9 illustrates the automated address acquisition instruction 504, which is an instruction sent by the master module 102 to a slave unit 106 at an address in the address space 224. The automated address acquisition instruction 504 includes a header with a format code, and each of the eight bytes of the broadcast serial number. Slave units 106 that receive the automated address acquisition instruction 504 must send a response to the master module 102 if the serial number 212 of the slave unit 106 is larger than or equal to the broadcast serial number.

Figure 10:
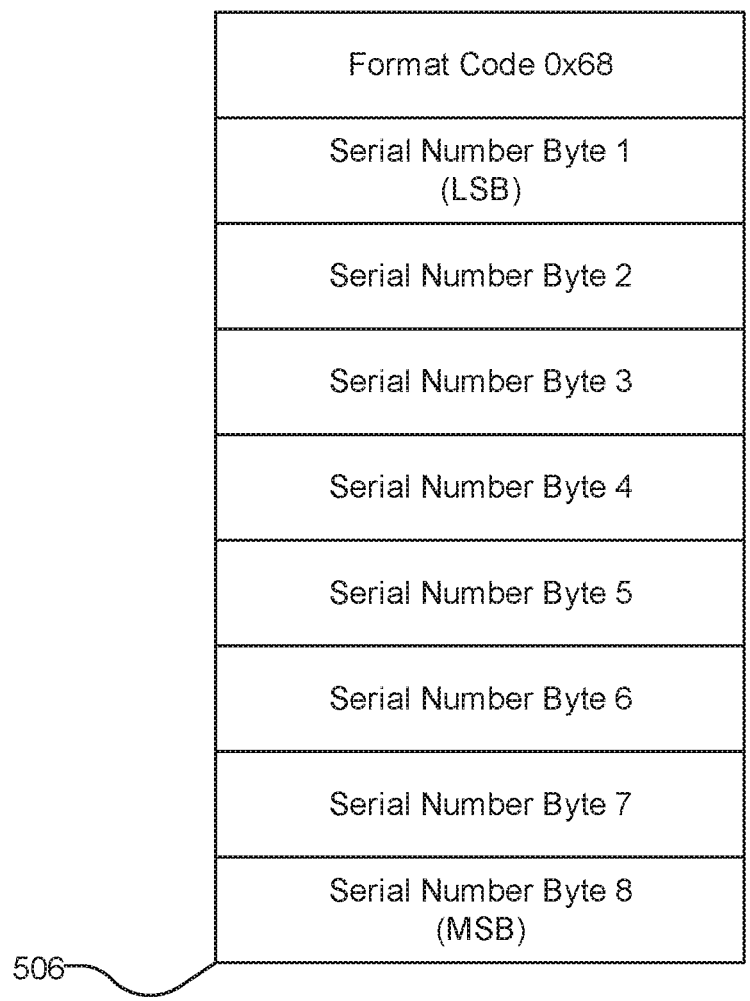
FIG. 10 illustrates the my serial number packet.

FIG. 10 illustrates the my serial number packet 506, which is sent by a slave unit 106 to the master module 102 in response to an automated address acquisition instruction 504. The my serial number packet 506 includes a header with a format code, and each of the eight bytes of the serial number 212 of the slave unit 106.

Returning to FIG. 3, in step 322, the master module 100 sends an automated address acquisition instruction 504 to the default address including the broadcast serial number. In step 324, slave units 106 responding to the default address compare the broadcast serial number to their own serial numbers 212. In step 326, it is determined by each slave unit 106 responding to the default address whether their own serial number 212 is larger than or equal to the broadcast serial number.

In step 328, if it is determined that none of the slave units 106 responding to the default address has a serial number 212 that is larger than or equal to the broadcast serial number, no reply is received by the master module 102. In step 330, the adjust number is decreased by half, and the broadcast serial number is then decreased by the value of the adjust number. In step 332 it is determined whether the adjust number is greater than the lowest possible serial number. If it is, step 322 is repeated. In this way, the broadcast serial number is adjusted downward and sent again by the master module 102 to the slave units 106 until either the adjust number becomes less than or equal to the lowest possible serial number, or until one or more slave units 106 respond to the master module 102.

If, on the other hand, it is determined in step 326 that one or more slave units 106 responding to the default address have a serial number 212 that is larger than or equal to the broadcast serial number, a my serial number packet 506 is sent from each slave unit 106 with a serial number 212 greater than or equal to the broadcast serial number to the master module 102.

If more than one slave unit 106 responds to the master module 102 in step 334, a data collision occurs. As a result, in step 336, the master module 102 receives a my serial number packet 506 which includes a serial number 212 that is potentially corrupt. Steps 338 through 342 illustrate the process of determining whether or not the serial number 212 received by the master module 102 in step 336 is corrupt.

Figure 11:
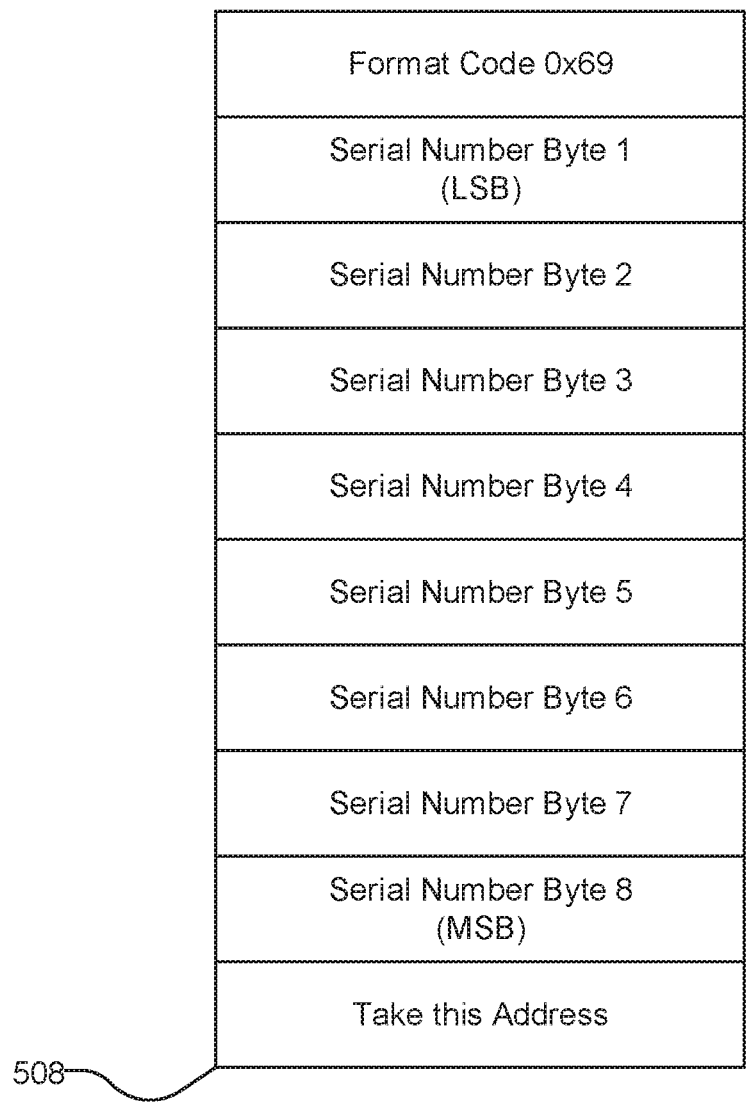
FIG. 11 illustrates the "I heard this serial number" instruction.

The master module 102 confirms the integrity of the serial number 212 received using a particular instruction. FIG. 11 illustrates the "I heard this serial number" instruction 508, which is an instruction sent by the master module 102 to a slave unit 106 at an address in the address space 224, in response to a my serial number packet 506. The "I heard this serial number" instruction 508 includes a header with a format code, each of the eight bytes of the serial number 212 received with the my serial number packet 506, and an address to be assigned to the slave unit 106 whose serial number 212 matches the serial number 212 included in the instruction. Slave units 106 that receive the "I heard this serial number" instruction 508 must send a response to the master module 102 if the serial number 212 of the slave unit 106 matches the serial number included in the instruction.

Figures 12, 13:
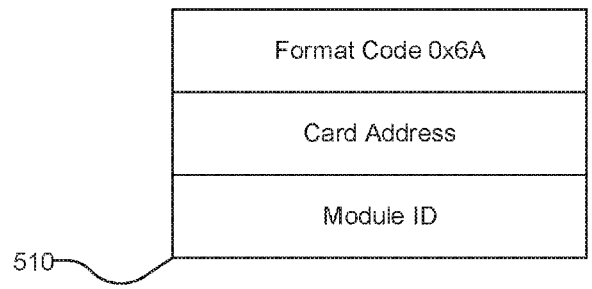
FIG. 12 illustrates the address transmission success packet.
FIG. 13 shows the address space after the first slave unit responding to the default address is assigned an address.

FIG. 12 illustrates the address transmission success packet 510, which is sent by a slave unit 106 to the master module 102 in response to the "I heard this serial number" instruction 508. The address transmission success packet 510 includes a header with a format code, a card address, and a module ID.

Returning to FIG. 3, upon receipt of a my serial number packet 506, the master module 102 sends an "I heard this serial number" instruction 508 to the default address including the serial number received and the next available address. In step 340, each slave unit 106 responding to the default address compares the serial number 212 included in the "I heard this serial number" instruction 508 to their own serial number 212. In step 342, it is determined whether the serial numbers are the same for any of the slave units 106.

If a match is found, in step 348, the slave unit 106 with the matching serial number 212 stores the address and sends an address transmission success packet 510 to the master module 102. The master module 102 then updates the address space 224 to list the slave unit 106 with the matching serial number under the next available address. The next available address is then determined and the search process starts over at step 320.

If, on the other hand, none of the serial numbers 212 of the slave units 106 responding to the default address matches the serial number 212 included in the "I heard this serial number" instruction 508 sent by the master module 102 in step 338, no response is received by the master module 102 in step 344, and it is determined that a data collision has occurred. In step 346, the adjust number is reduced by half, and the broadcast serial number is increased by the value of the adjust number. The search process then repeats in step 322, with the adjusted broadcast number. In this way, the broadcast serial number is adjusted upward and sent again by the master module 102 to the slave units 106 until a valid serial number 212 in step 342.

The search process continues until each slave unit 106 responding to the default address is isolated and assigned an address. When there are no slave units 106 responding to the default address (for example, when all of them have been assigned addresses), the broadcast serial number is adjusted downward and sent again in steps 322 through 332 until the adjust number is less than or equal to the lowest possible serial number, in which case the addressing process ends in step 350.

Returning to the illustrated example, at the start of the addressing process, a vacant slave address inquiry 502 is sent by the master module 102 to the default address. The second fire sensor unit 106-6-2, the IR detector unit 106-5, the manual activation switch unit 106-4, and the battery unit 106-2 all send a response to the master module 102. As a result, it is determined that there are unaddressed slave units 106 responding to the default address.

Next, the current address is set to "1". The master module 102 sends a vacant slave address inquiry 502 to the current address and receives a response from the first fire sensor unit 106-6-1. The current address is incremented to "2", and another inquiry is sent. This time, no response is received, and it is determined that address "2" is the next available address.

Assuming, for the purposes of this example, that the serial number space ranges from 1-999, the broadcast serial number is then set to "499", and the adjust number is set to "499".

Next, an automated address acquisition instruction 504 is sent to the default address with the broadcast serial number. The IR detector unit 106-5, whose serial number after bit reversal is "920", and the battery unit 106-2, whose serial number after bit reversal is "600", both respond with a my serial number packet 506, because both of their serial numbers are greater than the broadcast serial number. Because both slave units 106 respond simultaneously, there is a collision. The master responds with an "I heard this serial number" instruction 508, including a corrupted serial number.

Because the corrupted serial number does not match any of the serial numbers of the slave units 106 responding to the default address, the search is repeated with a broadcast serial number adjusted upward to "749". This time, only the IR detector unit 106-5 responds, and the IR detector unit 106-5 is assigned the next available address "2". An address transmission success packet 510 is sent to the master module 102 confirming that the address "2" was assigned to the IR detector unit 106-5.

FIG. 13 shows the address space 224 after the first slave unit 106 responding to the default address is assigned an address. The IR detector unit 106-5 is now assigned address "2", while the second fire sensor unit 106-6-2, the manual activation switch unit 106-4, and the battery unit 106-2 are all listed under the default address.

The addressing process then continues by determining the next available address "4" and restarting the search process with a broadcast serial number of "499" and an adjust number of "499". This time, only the battery unit 106-2 responds, and it is assigned address "3".

FIG. 14 shows the address space 224 after the second slave unit 106 responding to the default address is assigned an address. The battery unit 106-2 is now assigned to address "4", and the second fire sensor 106-6-2 and manual activation switch unit 106-4 are listed under the default address.

The addressing process then continues by determining the next available address "5" and restarting the search process with a broadcast serial number of "499" and an adjust number of "499". After bit reversal, the serial number 212 for the second fire sensor unit 106-6-2 is "408", and the serial number 212 for the manual activation switch unit 106-4 is "88". Since neither serial number is greater than "499", the broadcast serial number is adjusted downward to "249". This time, the second fire detector unit 106-6-2 responds and is assigned address "5".

FIG. 15 shows the address space 224 after the third slave unit 106 responding to the default address is assigned an address. The second fire sensor unit 106-6-2 is now assigned to address "5", and only the manual activation switch unit 106-4 is listed under the default address.

The addressing process continues by determining the next available address "6" and restarting the search process with a broadcast serial number of "499" and an adjust number of "499". After bit reversal, the serial number 212 for the manual activation switch unit 106-4 is "88". Since it is not greater than "499", the broadcast serial number is adjusted to "249" and sent again. This process repeats with broadcast serial numbers of "124" and "62" being sent. In response to the broadcast serial number of "62", the manual activation switch 106-4 responds and is assigned address "6".

Figure 16:
FIG. 16 shows the address space after the fourth and final slave unit responding to the default address is assigned an address.

FIG. 16 shows the address space 224 after the fourth and final slave unit 106 responding to the default address is assigned an address. The manual activation switch 106-4 is now assigned to address "6", and no slave units 106 are listed under the default address.

What is claimed is:

1. A method for assigning working addresses to slave units in a vehicle fire system, the method comprising:
identifying slave units responding to a default address;
determining available working addresses;
isolating individual slave units at the default address by instructing the slaves to compare their bit-reversed serial numbers to a broadcast serial number representing a potential slave unit serial number until only a single slave responds, wherein the bit-reversed serial numbers result from a bit reversal process in which bits in assigned serial numbers for the slave units are reversed to create a more sparse distribution of the serial numbers of the slave units; and
assigning the slave units, which responded to the default address, to the available working addresses.

2. The method as claimed in claim 1, wherein identifying slave units responding to the default address comprises sending a message to the default address and determining if any slave units reply.

3. The method as claimed in claim 1, wherein determining available working addresses comprises incrementing through working addresses until no slave units respond to a current address, which is then determined to be an available address.

4. The method as claimed in claim 1, further comprising choosing the broadcast serial numbers based upon a binary search strategy.

5. The method as claimed in claim 1, further comprising slaves responding with their newly assigned working address and at least part of their serial number.

6. A method for assigning working addresses to slave units in a vehicle fire system, the method comprising:
determining available working addresses;
isolating individual slave units at a default address by broadcasting different serial numbers to the default address and determining whether the slave units respond to the broadcast serial numbers until a single slave unit responds, wherein the slave units respond to the broadcast serial number in response to determining that their assigned serial numbers were equal to or larger than the broadcast serial number, and wherein the broadcasting the different serial numbers to the default address comprises initially setting a current serial number to half of a maximum serial number value and broadcasting the current serial number to the default address, increasing the current serial number by half of its current value in response to determining that more than one slave units responded to the broadcast serial number, and decreasing the current serial number by half of its current value in response to determining that no slave units responded to the broadcast serial number;
confirming that individual slave units have been isolated by responding with a potentially corrupt serial number and confirming whether a slave unit responded; and
assigning the slave units, which responded to the default address, to the available working addresses.

7. The method as claimed in claim 6, further comprising identifying slave units responding to the default address by sending a message to the default address and determining if any slave units reply.

8. The method as claimed in claim 6, wherein determining available working addresses comprises incrementing through working addresses until no slave units respond to a current address, which is then determined to be an available address.

9. The method as claimed in claim 6, further comprising slaves responding with their newly assigned working address and at least part of their serial number.

10. A vehicle fire system, comprising:
slave units; and
a master module comprising a controller and a transceiver for communicating with the slave units over a data bus of the vehicle fire system, wherein the master module assigns working addresses to the slave units by identifying slave units responding to a default address, determining available working addresses, and assigning the slave units, which responded to the default address, to the available working addresses, by isolating individual slave units at the default address by instructing the slaves to compare their bit-reversed serial numbers to broadcast serial numbers broadcast by the master module representing potential slave unit serial numbers until only a single slave unit responds, and wherein the bit-reversed serial numbers result from a bit reversal process in which bits in assigned serial numbers for the slave units are reversed to create a more sparse distribution of the serial numbers of the slave units at the default address.

11. A system as claimed in claim 10, wherein the slave units include fire sensors, release modules, infrared detectors, manual activation switches, and/or heat detectors.

12. The system as claimed in claim 10, wherein the master module identifies slave units responding to the default address by sending a message to the default address and determining if any slave units reply.

13. The system as claimed in claim 10, wherein the master module determines available addresses by incrementing through working addresses until no slave units respond.

14. The system as claimed in claim 10, wherein the master module chooses the broadcast serial numbers using a binary search strategy.

15. The system as claimed in claim 10, further comprising the slaves responding with their newly assigned working addresses and at least part of their serial numbers.

16. A vehicle fire system, comprising:
slave units; and
a master module comprising a controller and a transceiver for communicating with the slave units over a data bus of the vehicle fire system, wherein the master module assigns working addresses to the slave units by identifying slave units responding to a default address, determining available working addresses, and assigning the slave units, which responded to the default address, to the available working addresses, by isolating individual slave units at the default address broadcasting different serial numbers to the default address and determining whether the slave units respond to the broadcast serial numbers until a single slave unit responds, wherein the slave units respond to the broadcast serial number in response to determining that their assigned serial numbers were equal to or larger than the broadcast serial number, and wherein the broadcasting the different serial numbers to the default address comprises initially setting a current serial number to half of a maximum serial number value and broadcasting the current serial number to the default address, increasing the current serial number by half of its current value in response to determining that more than one slave units responded to the broadcast serial number, and decreasing the current serial number by half of its current value in response to determining that no slave units responded to the broadcast serial number, and confirming that individual slave units have been isolated by responding with a potentially corrupt serial number and confirming whether a slave unit responded.

17. The method as claimed in claim 6, wherein the confirming that individual slave units have been isolated includes:
- determining that one or more responses to the broadcast serial number were received from the slave units; and
- sending to the default address a potentially corrupt serial number from the one or more responses received from the slave units and determining whether any slave units respond with a success message to the potentially corrupt serial number, wherein the slave units send the success message in response to determining that the potentially corrupt serial number matches their assigned serial number.

18. The method as claimed in claim 17, wherein the assigning the slave units to the available working addresses includes sending a next available working address in a same message as the potentially corrupt serial number, the slave unit storing the next available address and sending the success message in response to determining that the potentially corrupt serial number matches their assigned serial number, and, in response to receiving the success message from the slave unit, updating an address space to list the slave unit with the matching serial number under the next available address.

19. The system as claimed in claim 16, wherein the master module confirms that individual slave units have been isolated by determining that one or more responses to the broadcast serial number were received from the slave units and sending to the default address a potentially corrupt serial number from the one or more responses received from the slave units and determining whether any slave units respond with a success message to the potentially corrupt serial number, wherein the slave units send the success message in response to determining that the potentially corrupt serial number matches their assigned serial number.

20. The system as claimed in claim 19, wherein the master module assigns the slave units to the available working addresses by sending a next available working address in a same message as the potentially corrupt serial number, the slave unit stores the next available address and sends the success message in response to determining that the potentially corrupt serial number matches their assigned serial number, and, in response to receiving the success message from the slave unit, the master module updates an address space to list the slave unit with the matching serial number under the next available address.

* * * * *